United States Patent [19]

Crisafulli

[11] Patent Number: 4,770,601
[45] Date of Patent: Sep. 13, 1988

[54] PUMP SHAFT BEARING PROTECTION SYSTEM

[75] Inventor: Angelo J. Crisafulli, Glendive, Mont.

[73] Assignee: Crisafulli Pump Company, Inc., Glendive, Mont.

[21] Appl. No.: 337,931

[22] Filed: Jan. 7, 1982

[51] Int. Cl.[4] .......................................... F01D 25/18
[52] U.S. Cl. ............................ 415/109; 277/135; 277/66; 384/398
[58] Field of Search ............... 415/109; 384/398, 428, 384/415, 438; 308/189 R, 187.1; 277/135, 3, 66, 130, 131, 132

[56] References Cited

U.S. PATENT DOCUMENTS

| | | | |
|---|---|---|---|
| 1,105,268 | 7/1914 | Gohlke | 308/187.1 |
| 1,429,065 | 9/1922 | Daggett | 308/189 R |
| 2,018,221 | 10/1935 | Mueller | 308/189 R X |
| 2,719,065 | 9/1955 | Hornbostel | 384/398 |
| 2,740,647 | 4/1956 | Van Pelt | 277/135 X |
| 2,949,333 | 8/1960 | Lesinski | 308/187.1 |
| 3,192,422 | 6/1965 | Kober | 308/189 R X |
| 3,361,491 | 1/1968 | Nowisch | 308/189 R X |
| 3,371,614 | 3/1968 | Crisafulli | 415/98 |
| 4,037,890 | 7/1977 | Kurita et al. | 384/415 |
| 4,082,525 | 4/1978 | Allan | 277/135 X |

FOREIGN PATENT DOCUMENTS

| | | | |
|---|---|---|---|
| 227035 | 4/1963 | Austria | 308/189 R |
| 2010989 | 7/1979 | United Kingdom | 277/3 |
| 2027135 | 2/1980 | United Kingdom | 308/189 R |
| 2054767 | 2/1981 | United Kingdom | 308/187.1 |

OTHER PUBLICATIONS

PCT Application #PCT/AU81/00007 Jan. 15, 1981, Marsh.

Primary Examiner—Harvey C. Hornsby
Assistant Examiner—Frankie L. Stinson
Attorney, Agent, or Firm—Fleit, Jacobson, Cohn & Price

[57] ABSTRACT

A protection system for pump shaft bearings which are exposed to water or water combined with various particulate material when the pump and the shaft or a portion thereof are immersed in the water or combined water and particulate material which is being pumped. The protection system includes an enclosing chamber associated with the bearing or bearings supporting the pump shaft which are immersed in the material being pumped with the enclosing chamber being filled with grease exiting from the bearing so that the pressurized lubricant to the bearing will maintain the enclosing chamber filled with grease to exclude the material being pumped from the enclosing chamber and bearing assembly disposed therein. The enclosing chamber is associated with and connected to a conventional flanged shaft bearing and includes grease seals associated with the pump shaft to maintain the interior of the enclosing chamber in isolated relation to exterior environmental conditions.

7 Claims, 2 Drawing Sheets

U.S. Patent    Sep. 13, 1988    Sheet 2 of 2    4,770,601
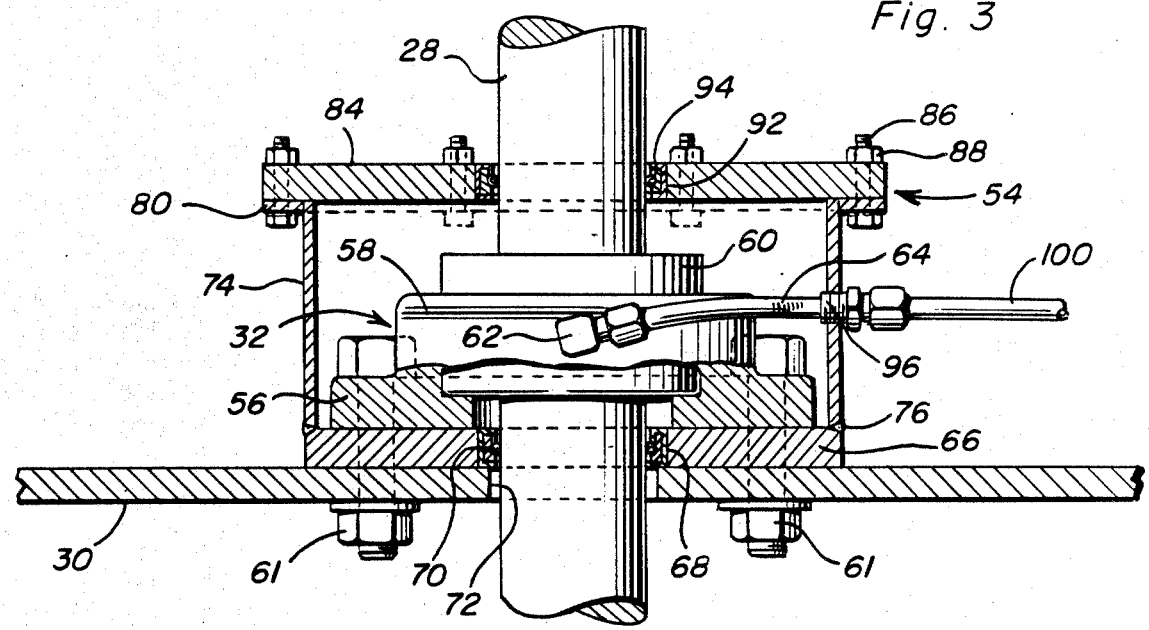
Fig. 3
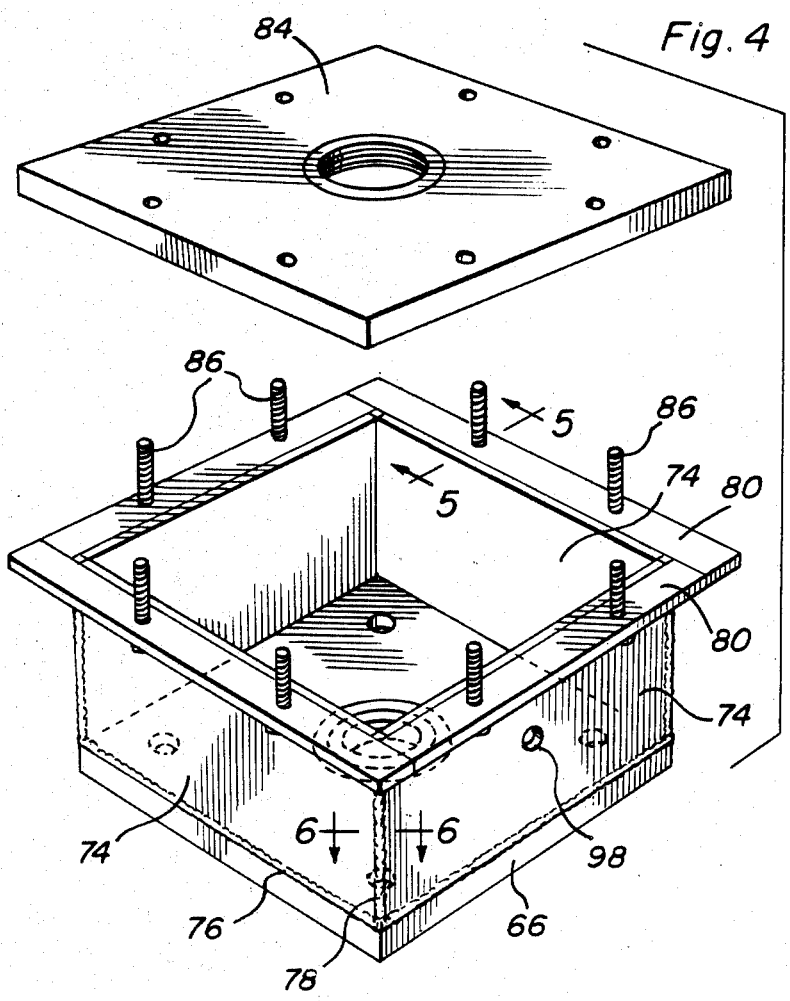
Fig. 4
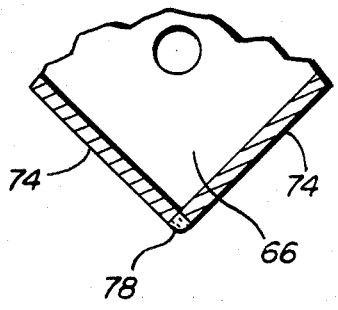
Fig. 5
Fig. 6

PUMP SHAFT BEARING PROTECTION SYSTEM

BACKGROUND OF THE INVENTION

1. Field of the Invedntion

The present invention generally relates to a bearing protection system and more specifically a protection system for the exposed bearings of an elongated pump shaft for a pump which is immersed in various types of liquids or combined liquids and particulate matter, such as slurries and the like, with the protection system including a chamber enclosing the immersed bearings and being filled with grease to exclude liquids or combined liquids and particulate material from contact with the bearing.

2. Description of the Prior Art

My prior U.S. Pat. No. 3,371,614 discloses a centrifugal pump having an external drive shaft supported from bearing structures and support arrangements connected to a frame. The entire pump and bearing structures may be immersed in the water or other material being pumped. This patent also discloses a dual suction inlet for the centrifugal pump with the pump shaft extending to both sides of the pump housing and rotatably supported on both sides of the housing. As can be appreciated, these bearings, when immersed in water, such as an irrigation pond, ditch, or the like, or when immersed in a settling pond or in other areas which contain pumpable liquid or liquid combined with particulate material will be subjected to rather rapid deterioration and wear of the bearing structures, thus requiring repair or replacement. While various types of bearing structures have been provided for pump shafts of this type, there still remains a problem of bearings used in this manner having a relatively short life expectancy.

SUMMARY OF THE INVENTION

An object of the present invention is to provide a protection system for exposed pump shaft bearings which are immersed in the material being pumped along with the pump itself in order to prolong the life expectancy of such bearings.

Another object of the invention is to provide a protection system for pump shaft bearings in which each pump shaft bearing being protected is provided with a stationarily supported enclosing chamber for the bearing which is sealingly related to the shaft and is filled with grease which exits from the bearing with such grease being supplied to the bearing by a pressure system by which lubricating grease is pumped into the bearing at periodic intervals.

A further object of the invention is to provide a pump shaft bearing protection system in accordance with the preceding objects in which each enclosing chamber is provided with a bottom plate, cover plate and side plates rigidly and fixedly secured together in enclosing relation to a pump shaft bearing of a conventional type provided with a mounting flange at one end thereof and provided with a lubricating line communicated therewith by which lubricating grease is supplied to the bearing and the interior of the enclosing chamber.

Still another object of the invention is to provide a protection system for the exposed bearings on an exposed pump shaft that is immersed in the material being pumped to protect the bearings from adverse effects of the material being pumped, thereby prolonging the effective life of the bearings with the protection system being relatively simple, easy to install and effective for its purpose of protecting the pump shaft bearings.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a sectional view, on an enlarged scale, taken substantially upon a plane passing along section line 3—3 of FIG. 2, illustrating the specific structural details of the enclosing chamber and its relationship to the shaft bearing, shaft and supporting plate.

FIG. 4 is an exploded, group perspective view of the components of the enclosing chamber.

FIG. 5 is a sectional view taken substantially upon a plane passing along section line 5—5 of FIG. 4, illustrating the specific structure of the side plate, flange and cover retaining bolt.

FIG. 6 is a fragmental sectional view taken substantially upon a plane passing along section line 6—6 of FIG. 4, illustrating the structural connection between the side plates.

DESCRIPTION OF THE PREFERRED EMBODIMENT

Figure 1:
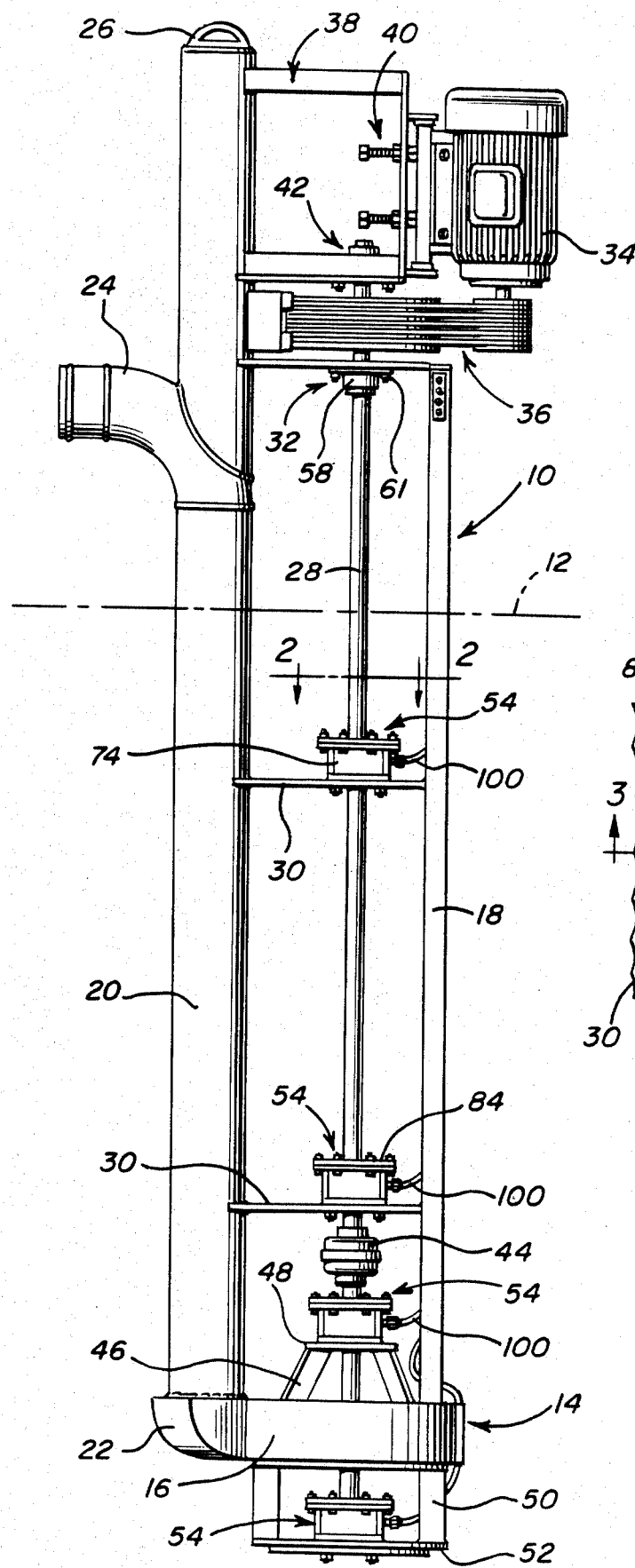
FIG. 1 is a side elevational view of a pump assembly including an exposed pump shaft with supporting bearings and the protection system of the above invention incorporated therein.
Figure 2:
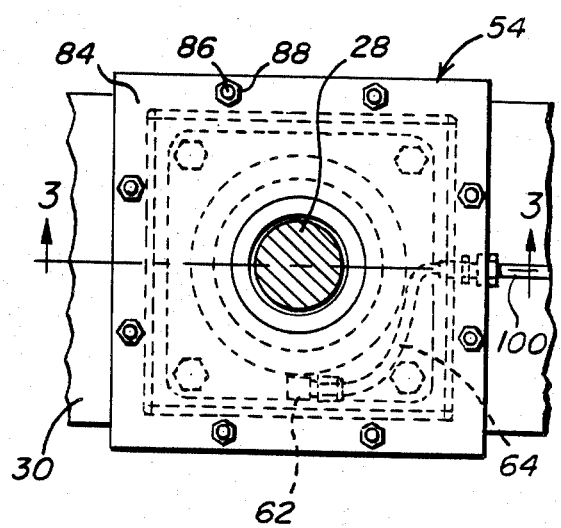
FIG. 2 is a sectional view, on an enlarged scale, taken substantially upon a plane passing along section line 2—2 of FIG. 1, illustrating the orientation of the protection system of the present invention with respect to the pump shaft.

Referring now specifically to the drawings, a portable pump assembly in which the protection system of the present invention is used is generally designated by numeral 10 and is vertically oriented or otherwise supported in a generally vertical orientation in a body of liquid material, such as water or water combined with particulate material, such as slurries, and the like found in settling ponds, sewage disposal systems, and the like, in which the water or liquid level is schematically illustrated and designated by numeral 12. In this arrangement, a centrifugal pump assembly 14 including a housing 16 is oriented below the water level 12 with the pump being a dual suction centrifugal pump, such as disclosed in the aforementioned U.S. Pat. No. 3,371,614, or other types of submersible pumps, such as a single suction centrifugal pump, or the like. The pump housing is rigidly connected with a supporting frame 18 in the form of frame rails or the like and the housing 16 is also communicated with a discharge pipe 20 that is parallel to but spaced from the frame 18 with the discharge pipe 20 being connected to the housing 16 by a transition member 22. The discharge pipe 20 extends vertically above the water level 12 and includes a laterally curving discharge branch 24 connected to any suitable conduit, pipe, or the like. The pipe 20 extends beyond the branch 24 and beyond the frame 18 and terminates in a cap having a loop 26 thereon by which the pump assembly can be supported by a suitable lifting cable, hook, or the like. As is conventional, the pump assembly 14 includes a pump shaft 28 which is parallel to the frame 18 and is spaced between the frame 18 and the discharge pipe 20 although this orientation may vary since the discharge pipe 20 may be oriented in other configurations. A plurality of transversely extending support plates 30 are provided between the frame 18 and the discharge pipe 20 with these plates 30 forming a support for conventional flanged bearing assemblies 32. The upper end of the shaft 28 is drivingly connected to a motor 34, such as an electric motor, that is connected drivingly to the shaft 28 by a multiple belt and sheave assembly 36 which is conventional in construction. The motor 34 is supported by supporting brackets 38 welded to the upper end of the discharge pipe 20 adjacent the cap 26 and the brackets 38 include a belt tightener assembly 40 to maintain proper driving association between the motor 34 and the shaft 28. Also, the brackets 38 may support a thrust bearing 42 which supports the upper end of the pump shaft 28. The specific structure of the motor and its support and its driving connections to the shaft 28 and the bearing assemblies 32 are all conventional in and of themselves. Also, the shaft 28 is provided with a coupling and cover assembly 44 adjacent the pump housing 16 with the coupling being a conventional chain coupling. Also, the upper end of the housing 16 is provided with supporting brackets 46 and a supporting plate 48 at the upper end thereof and the lower end of the housing 16 is provided with supporting brackets 50 depending therefrom and a support 52 at the lower end thereof with each of the support plates 30 and the support plates 48 and 52 normally being provided with a flanged bearing assembly 32.

As illustrated, each of the bearing assemblies 32 disposed below the water level 12 is provided with an enclosing chamber generally designated by the numeral 54 which forms the protection system for the bearings 32. The uppermost bearing assembly 32 for the pump shaft 28 is above water level and does not require an enclosing chamber 54 although such an enclosing chamber could be provided for the uppermost bearing assembly if desired.

As illustrated in FIG. 3, each bearing assembly 32 includes a mounting flange 56 at one end of a housing 58 which encloses the bearing 60 with the flange 56 normally being supported from the support plate 30 by mounting bolts 61. The housing 58 is provided with a lubricating fitting 62 to supply lubricating grease to the bearing 60 through a lubricating line 64 with the grease being periodically discharged into the housing and bearing by pressurizing grease or the lubricating material which is in communication with the lubricating line 64. This structure of the bearing assembly 32 is conventional in and of itself.

Each enclosing chamber 54 includes a bottom plate 66 which is interposed between the flange 56 and the support plate 30 with the bottom plate 66 being secured to the support plate 30 by the mounting bolts 61 which extend through the flange 56 and the support plate 30 as illustrated in FIG. 3. The bottom plate 66 includes an opening 68 through which the pump shaft 28 extends and a grease seal 70 is disposed in the opening 68 to prevent the material being pumped from entering the enclosing chamber 54. The support plate 30 also includes an opening 72 aligned with the opening 68 through which the pump shaft 28 extends. The enclosing chamber 54 also includes a plurality of side plates 74 with the side plates 74 being perpendicular to the bottom plate 66 and perpendicular to each other with the bottom plate 66 being square and the side plates 74 being of equal length and rigidly secured to the top edge surface of the bottom plate 66 by welding 76 as illustrated in FIGS. 3 and 4. Also, the vertical side edges of the side plates 74 are interconnected by welding 78 forming a bead between the adjacent ends of intersecting plates 74 as illustrated in FIG. 6.

The upper edge of each side plate 74 is provided with a flange 80 which extends laterally outwardly therefrom in perpendicular relation thereto with the flanges 80 being secured to the side plates 74 by welding 82. As illustrated in FIG. 4, two of the flanges 80 are longer than the other two and the ends are oriented in abutting relation so that a continuous peripheral flange is provided for the box-like structure that is defined by the bottom plate 66 and the side plates 74.

A cover plate 84 is mounted on the flanges 80 and forms a closure for the enclosing chamber 54 and is secured to the flanges 80 by bolts 86 which have nuts 88 on their upper ends and the lower end or head end of the bolts 86 are welded to the undersurface of the flanges 80 by welding 90 as illustrated in FIG. 5. The cover plate 84 includes an opening 92 receiving the pump shaft 28 and a seal 94 is positioned in the opening 92 for sealing engagement with the pump shaft 28 to exclude the material being pumped from entering the enclosing chamber 54.

The lubricating line 64 is provided with a fitting 96 which extends through and is threadedly engaged with an opening 98 in one of the side plates 74 as illustrated in FIGS. 3 and 4 and a lubricating line 100 is connected with the fitting 96 to supply lubricant material, such as grease to the bearing 60 and this grease, when discharged from the bearing, will fill the enclosing chamber 54 thereby further excluding the material being Pumped so that it does not come into contact with the bearing.

The lubricating line 100 may be connected to a suitable grease gun or manually operated pump, or the like, or there may be an automatic lubricator provided which will pressurize the lubricant to lubricate the bearing and also maintain the enclosing chamber 54 filled with grease. While each of the supporting plates 30, 48 and 52 are shown provided with an enclosing chamber, it is pointed out that the number of supporting plates and the specific arrangement of the supporting plates and the specific arrangement of the pump shaft may vary depending upon the type of pump with which the protection system is employed and the type of drive unit employed to drive the shaft 28. Also, the specific arrangement of the supportirg plates, the supporting frame and discharge pipe may be varied depending upon the particlar type of pump used and the drive mechanism therefor and the manner in which the pump is used. The welded construction of the box-like structure and the manner in which it is associated with the bearing assemblies 32 and supported from the support plates 30 or the other support plates provide an easily constructed and readily assembled protection system for pump bearings of the type illustrated or any other pump bearings used with an exposed pump shaft where such bearings are normally in direct contact with the material being pumped which contact introduces rapid deterioration, wear, corrosion and the like of the bearing assemblies. The protection system of the present invention will materially prolong the life expectancy of such bearings and thereby renders the pump more effective in operation with less time out of service for repairs, and the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A protection system for an exposed pump shaft bearing having an external housing and supporting a pump shaft and being subject to immersion in the material being pumped to prevent such material from adversely affecting the pump shaft bearing life, said protection system comprising an enclosure for the pump shaft bearing including end plates interconnected by a peripheral wall spaced from and completely enclosing the pump shaft bearing with each end plate having an opening receiving said pump shaft, seal means in the opening in each end plate for sealing the shaft with respect to the end plates thereby isolating the interior of the enclosure from environmental conditions, and means discharging lubricating material into the enclosure for filling the enclosure with lubricating material to exclude material being pumped from the enclosure, said means discharging lubricating material into the enclosure including a lubricating material supply line extending to the pump shaft bearing enclosed by the enclosure with the lubricating material being pressurized to lubricate the bearing and discharge lubricant from the bearing into the enclosure for filling with lubricant material.

2. The structure as defined in claim 1 wherein one of said end plates is positioned against a support member for the pump shaft bearing with the pump shaft bearing engaging the opposite surface of said one of said end plates and bolt means extending through the pump shaft bearing and said one of said end plates for securing the enclosure and bearing to the support member.

3. The structure as defined in claim 1 wherein one end plate is removably attached to the peripheral wall to facilitate assembly and disassembly of the enclosure with respect to the pump shaft bearing and providing access to the interior of the enclosure.

4. The structure as defined in claim 1 wherein said enclosure is constructed of welded components with the peripheral wall including a peripheral flange at one end thereof and one of said end plates being removably connected to said peripheral flange.

5. In combination with a pump of the type submerged below the surface of liquid material to be pumped with an exposed drive shaft extending from a power device to the pump, frame means connected to and supporting the pump, at least one bearing assembly supported from the pump supporting frame means and journaling the pump shaft and located below the liquid material level, a protector for the bearing assembly comprising an enclosure for the bearing assembly, said enclosure being sealingly engaged with the pump shaft and supported from the frame means in completely enclosing relation to the bearing assembly, and means filling the interior of the enclosure with a lubricant material to exclude entry of liquid material being pumped into the interior of the enclosure thereby excluding contact between such material and the bearing assembly.

6. The structure as defined in claim 5 wherein said enclosure is in the form of a box-like structure having a bottom plate, a peripheral wall and a removable cover plate, said bearing assembly being positioned in the box-like structure and including a flange engaging the bottom plate and mounting bolts extending through the flange and bottom plate to support the pump shaft from the supporting frame means, said cover plate being removable from the box-like structure to provide access to the interior of the enclosure.

7. The combination as defined in claim 5 wherein said means filling the interior of the enclosure includes a pressurized lubricant supply line communicated with the bearing assembly supporting the pump shaft and extending externally of the enclosure to supply pressurized lubricant to the bearing assembly with the lubricant discharged from the bearing assembly filling the enclosure, said enclosure including openings receiving the pump shaft and seal means in each of the openings in retain lubricant in the enclosure but enable discharge thereof upon pressurization and excluding entry of the material being pumped into the enclosure.

* * * * *